United States Patent [19]

Grosshandler

[11] Patent Number: 4,613,163

[45] Date of Patent: Sep. 23, 1986

[54] JOINT FOR PIPE

[75] Inventor: Sandor Grosshandler, Houston, Tex.

[73] Assignee: The Dow Chemical Company, Midland, Mich.

[21] Appl. No.: 794,809

[22] Filed: Nov. 4, 1985

[51] Int. Cl.$^4$ .................................... F16L 23/00
[52] U.S. Cl. ...................................... 285/27; 285/55; 285/408; 285/330
[58] Field of Search ............... 285/55, 408, 409, 410, 285/411, 367, 366, 365, 27, 330

[56] References Cited

U.S. PATENT DOCUMENTS

| 4,281,859 | 8/1981 | Davies | 285/55 |
| 4,313,625 | 2/1982 | West | 285/55 |
| 4,568,109 | 2/1986 | Prueter | 285/55 X |

FOREIGN PATENT DOCUMENTS

| 2614477 | 10/1977 | Fed. Rep. of Germany | 285/410 |
| 598864 | 10/1959 | Italy | 285/365 |
| 307454 | 5/1929 | United Kingdom | 285/411 |

Primary Examiner—Thomas F. Callaghan

[57] ABSTRACT

The invention provides a simple means of pipe end alignment.

3 Claims, 4 Drawing Figures

JOINT FOR PIPE

Certain grades of pipe advantageously are joined by placing a loose tapered ring over the pipe, flaring the pipe and joining the pipe by means of a split V clamp. Such joints are particularly desirable in malleable plastic lined pipe wherein a flange can be formed on both the pipe and the pipe liner. Such a desirable pipe joint is described in U.S. Pat. No. 4,313,625 filed Feb. 2, 1982. A particularly desirable method of flanging such pipe is set forth in U.S. Pat. No. 4,520,547 issued June 4, 1985. Generally, joints in accordance with U.S. Pat. No. 4,313,625 are quite desirable. However difficulty can be encountered in getting the proper alignment of the pipe ends particularly when the joints are to be made in physically awkward locations. For reliable joints for extended service alignment of the pipe ends is highly desirable.

It is an object of this invention to provide improved pipe end aligning means.

It is also an object of this invention to provide improved pipe end aligning means.

It is also an object of this invention to provide a simple means of pipe end alignment.

It is also an object of this invention to provide pipe end alignment means which are readily positionable in physically awkward positions.

These benefits and other advantages in accordance with the present invention are achieved in an improved pipe joint, the pipe joint comprising a plastic lined conduit having a synthetic resinous pressure deformable liner disposed within a pressure deformable metal conduit, said plastic lined conduit having at least one end, the conduit end defining a radially outwardly projecting flange composed of deformed metal of the metal conduit and deformed plastic of the liner, a loose ring having a generally planar face and a tapering face, the loose ring being disposed about the conduit with the generally planar face of the ring disposed against a metal portion of the outwardly projecting flange, the loose ring having the tapering face remote from the radially outwardly projecting flange, the tapering face tapering outwardly toward a periphery of the flange, a split "V" clamp disposed about the loose ring and an opposed tapering surface of generally like configuration to the tapering face of the loose ring, and the split "V" clamp thereby forcing the deformed plastic of the liner against an opposed liner engaging sealing surface, the improvement which comprises providing as loose rings having a face remote from the tapering face defining at least one land and one groove, the land and groove being of generally arcuate configuration and having a center of generation at the center of the ring, the groove subtending a greater angle with the center of generation than the land, the land adapted to interfit with a groove of a like ring and thereby center adjacent pipe ends.

Further features and advantages of the present invention will become apparent in the following specification taken in connection with the drawing wherein.

Figure 1:
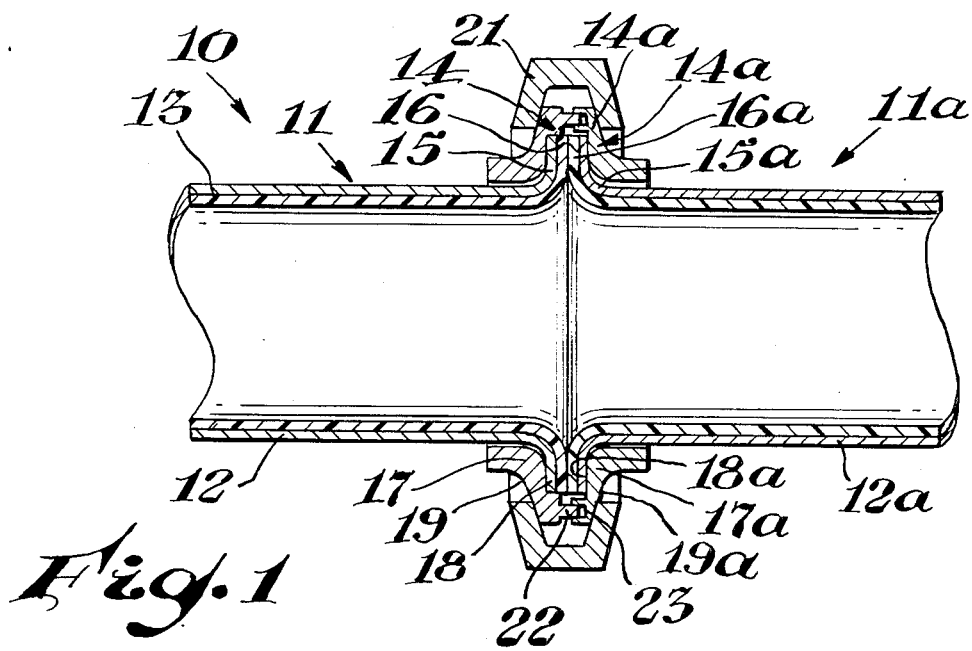
FIG. 1 depicts a sectional view of a pipe joint in accordance with the present invention.

In FIG. 1 there is depicted a conduit joint in accordance with the present invention generally designated by the numeral 10. The conduit joint comprises a first conduit 11 and a second conduit 11a of like construction. The conduit 11 has a generally hollow cylindrical metal body 12 having disposed therein a hollow deformable plastic liner 13. The conduit 11 terminates in a flange generally designated by the reference numeral 14. Flange 14 is generally radially outwardly extending and comprises a first or metal portion 15 and a sealing or plastic liner portion 16 which is in engagement with a like flange portion 16a. Loose rings 17 and 17a are disposed about the conduits 11 and 11a respectively. The loose ring 17 has a generally planar radially extending face 18 disposed immediately adjacent the flange 14. The loose ring 17 has a tapering face 19 which tapers toward the flange 14 and is disposed remote therefrom. Conduit 11a is of similar construction wherein like components are designated by like reference numerals having the suffix "a". A split "V" clamp 21 is disposed about the loose rings 17 and 17a and engages the tapering faces 19 and 19a forcing the flange portions 16 and 16a into sealing engagement. On the generally planar face 18 there is formed a land 22 and a groove 18a. On face 18 there is defined a groove 23 and a land not shown.

Figure 2:
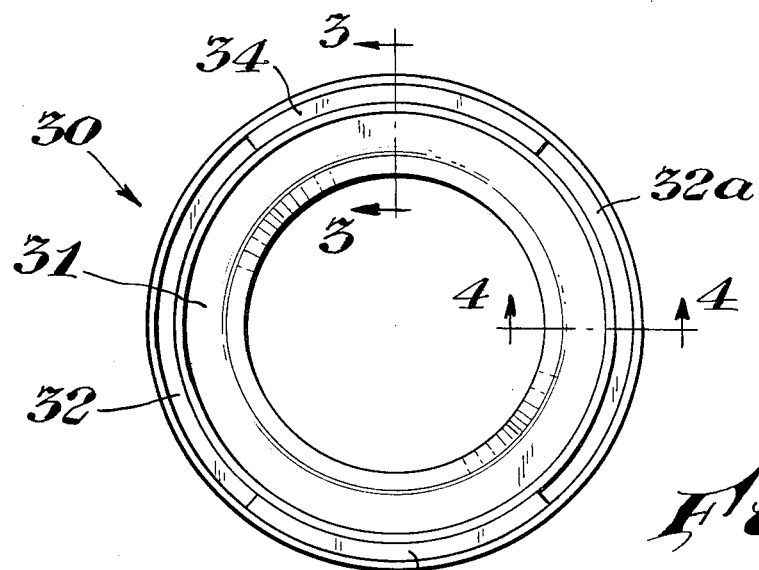
FIG. 2 is a face view of a loose ring in accordance with the present invention.

In FIG. 2 there is depicted a face view of a ring 30 useful in the practice of the present invention. The ring 30 has a generally planar face 31 having defined therein a first groove 32 and a second groove 32a. The ring 30 on the face 31 has a first land 34 and a second land 34a of generally rectangular cross section. The grooves 32 and 32a each subtend an angle with the center of generation of the grooves which is greater than the angle subtended by the lands 34 and 34a and have a generally rectangular cross section.

Figure 3:
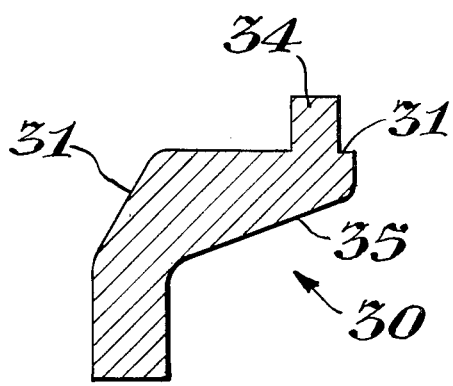
FIG. 3 is a cross section of the ring of FIG. 2 taken along the line 3—3.

FIG. 3 is a cross section of the ring 30 along the line 3—3 showing the configuration of land 34 on face 31 which is disposed remotely from a tapering or clamping face 35.

Figure 4:
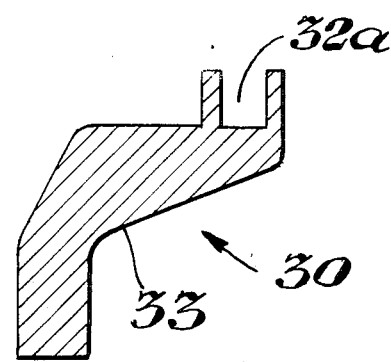
FIG. 4 is a cross section of the ring of FIG. 2 taken along the line 4—4.

FIG. 4 is a cross section of the ring 30 taken through the line 4—4 showing the configuration of the face defining the groove 32a. When a pair of rings 30 are disposed over flanged pipe, they are brought together and rotated until the lands oppose grooves and the lands are forced into the grooves to provide positive alignment of the pipe joint, the split "V" clamp is applied and tightened in the manner set forth in U.S. Pat. No. 4,313,625, the teaching of which is incorporated herewith by reference.

FIG. 2 is described as utilizing 2 lands and 2 grooves. One land and one groove may be employed or a plurality of lands and grooves. It is highly desirable that the lands have a length shorter than the grooves to permit rapid assembly. If desired, the lands and grooves may have an interfitting tapering configuration.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An improved pipe joint, the pipe joint comprising a plastic lined conduit having a synthetic resinous pressure deformable liner disposed within a pressure deformable metal conduit, said plastic lined conduit having at least one end, the conduit end defining a radially outwardly projecting flange composed of deformed metal of the metal conduit and deformed plastic of the liner, a loose ring having a generally planar face and a tapering face, the loose ring being disposed about the conduit with the generally planar face of the ring disposed against a metal portion of the outwardly projecting flange, the loose ring having the tapering face remote from the radially outwardly projecting flange, the tapering face tapering outwardly toward a periphery of the flange, a split "V" clamp disposed about the loose ring and an opposed tapering surface of generally like configuration to the tapering face of the loose ring, and the split "V" clamp thereby forcing the deformed plastic of the liner against an opposed liner engaging sealing surface, the improvement which comprises providing as loose rings having a face remote from the tapering face defining at least one land and one groove, the land and groove being of generally arcuate configuration and having a center of generation at the center of the ring, the groove subtending a greater angle with the center of generation than the land, the land adapted to interfit with a groove of a like ring and thereby center adjacent pipe ends.

2. The joint of claim 1 wherein each loose ring defines two diametrically opposed lands and two diametrically opposed grooves.

3. The joint of claim 1 wherein the grooves and lands have generally rectangular cross section configuration.

* * * * *